March 31, 1964 M. A. HANSON 3,127,222
TRACTION MOTOR SUPPORT BEARING
Filed June 21, 1961

INVENTOR
MELVIN A. HANSON
BY Robert L. Lehman
AGENT

United States Patent Office 3,127,222
Patented Mar. 31, 1964

3,127,222
TRACTION MOTOR SUPPORT BEARING
Melvin A. Hanson, Downers Grove, Ill., assignor to National Lead Company, New York, N.Y., a corporation of New Jersey
Filed June 21, 1961, Ser. No. 118,553
2 Claims. (Cl. 308—36.1)

The present invention relates to a new and novel traction motor support bearing, and more particularly to an improved means of mounting the dust guard on the support bearing at the commutator end of a locomotive traction motor mounted on a conventional axle.

It is conventional in the art to provide a dust guard on the traction motor support bearing mounted at the commutator end of a conventional locomotive traction motor. In the past, a separate dust guard was provided and held in place by clamping means so as to clamp the dust guard in place. It has been found that this arrangement shortens the effective life of the bearing since the dust guard tends to loosen under operating conditions permitting frictional wear and the introduction of dust and other foreign matter into the area between the axle and the bearing.

As a result of this undesirable characteristic in the prior art, a support bearing as shown in United States Patent 2,954,263 was developed wherein the support bearing and dust guard support is formed integrally. This arrangement has successfuly solved the problem previously encountered by loosening of the dust guard with respect to the bearing, but on the other hand, certain other disadvantages are encountered with such an integral arrangement. The integral bearing and dust guard arrangement as shown in the above-mentioned patent is relatively expensive to manufacture, and, of course, should either the bearing portion or the dust guard portion become excessively worn, it is necessary to replace the entire unit. Additionally, it is necessary to provide two different castings, one to be employed adjacent the pinion end of the motor while the other is employed adjacent the commutator end of the motor.

The present invention employs a novel arrangement which overcomes the disadvantages encountered with earlier prior art arrangements. In the present invention, the bearing means comprises a pair of bearing members having substantially semi-cylindrical sleeve portions with radially extending flange portions at one end thereof.

A dust sealing means support means comprises a pair of support members which cooperate to form a substantially annular means having a peripheral annular groove formed in an inner surface thereof and facing radially inwardly thereof, this groove being adapted to carry a dust sealing means.

The support members are separate from the flange formed on the bearing members and extend longitudinally beyond the end of the bearing members. The support members are mounted in operative position by means of a plurality of dowels which have a force-fit with aligned openings formed in the bearing members and the support members thereby rigidly interconnecting the bearing members and the support members.

With the arrangement of the present invention, the support means for the dust sealing means can not loosen up with respect to the bearing portion, and accordingly, this disadvantage of the earlier prior art arrangements is overcome.

In addition, the arrangement of the present invention is superior to that of the integral unit shown in the aforementioned patent, since the structure of the present invention is cheaper in construction, and also the bearing members and support members may be separately replaced as wear occurs thereon instead of discarding the entire unit as is necessary when these members are integral with one another.

Additionally, the bearing members of the present invention may be utilized either at the pinion end or the commutator end of the motor, and accordingly, it is not necessary to provide separate castings for the bearings employed at opposite ends of the motor as is necessary with the arrangement shown in the aforementioned patent.

An object of the present invention is to provide a traction motor support bearing incorporating a new and novel means of mounting a dust sealing means thereon.

Another object of the invention is the provision of a traction motor support bearing wherein the support means for the dust sealing means is separately attached thereto such that worn portions may be separately replaced when desired.

A further object of the invention is to provide a new and novel traction motor support bearing and means for supporting a dust sealing means which is of cheaper construction than a unit wherein the bearing means and support means for the dust sealing means are integral.

A still further object of the invention is to provide a traction motor support bearing wherein the means for supporting the dust sealing means is separate and yet will not loosen with respect to the bearing means during use.

Yet another object of the invention is to provide a traction motor support bearing which is quite simple and inexpensive in construction and yet which is rugged and reliable in operation.

Other objects and many attendant advantages of the invention will become more apparent when considered in connection with the specification and accompanying drawing, wherein.

Figure 1:
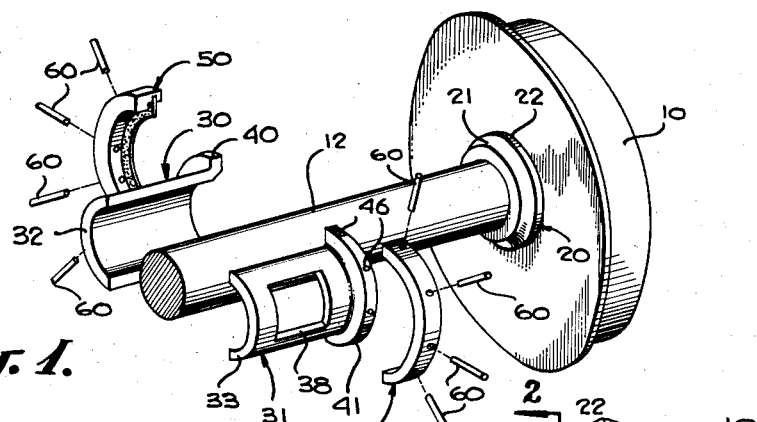
FIG. 1 is an exploded perspective view illustrating the relation of the components with respect to one another.

Referring now to the drawings wherein like reference characters designate corresponding parts throughout the several views, there is shown in FIG. 1 a wheel 10 and an axle 12 of a conventional railway truck assembly. These components are of conventional construction and are shown for example in U.S. Pat. 2,954,263, it being understood that the axle is associated with a conventional traction motor as shown in this U.S. patent, the bearing portions of the present invention being supported within conventional axle support assemblies associated with the traction motor.

Figure 3:
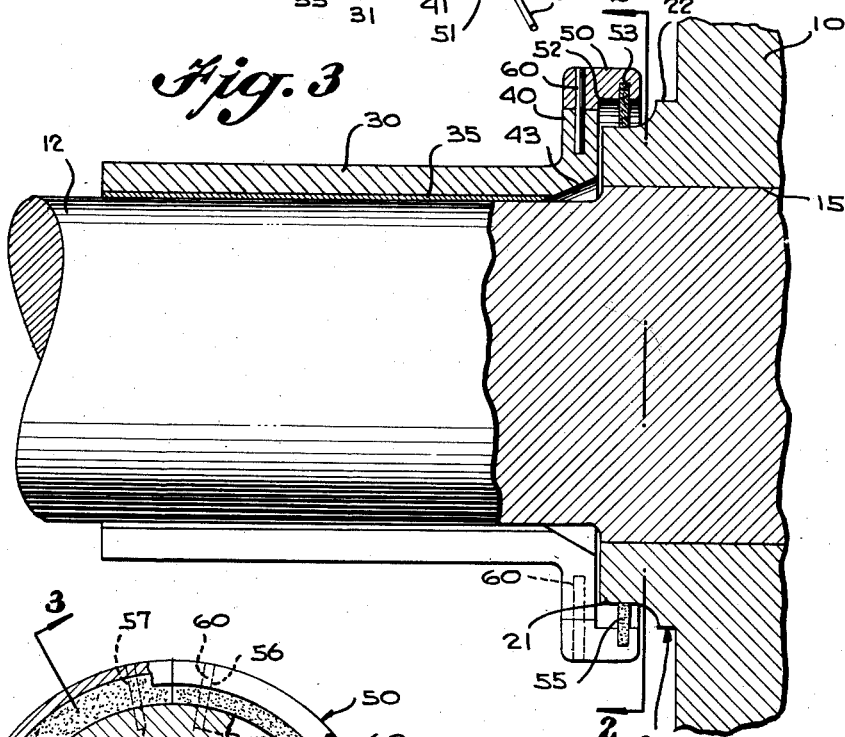
FIG. 3 is a sectional view taken substantially along line 3—3 of FIG. 2 looking in the direction of the arrows.

Referring to FIG. 3, it will be seen that the end of axle 12 is provided with an enlarged projecting shaft portion 15 which engages and is locked to the wheel 10. The wheel is provided with an inwardly projecting flange 20 having a reduced inwardly extending step 21 between the axle 12 and the outer periphery 22 of flange 20. This structure is conventional in the art.

The bearing means includes a pair of complementary bearing members indicated generally by reference numerals 30 and 31, these bearing members including substantially semi-cylindrical sleeve portions 32 and 33 respectively which are adapted to encircle the shaft 12. The interior surfaces of the bearing members may be provided with a suitable lining such as indicated at 35 in FIG. 3, this lining being formed preferably of so-called white metal to improve the anti-friction qualities of the bearing members.

As seen in FIG. 1, bearing member 31 is provided with a lubricating window 38 through which an end portion of a wick (not shown) of a conventional lubricator assembly as shown in the aforedescribed U.S. patent may project for lubricating the shaft 12.

As seen in FIG. 1, bearing members 30 and 31 are provided with radially extending substantially semi-cylindrical flanges 40 and 41 respectively. It is apparent that when bearing members 30 and 31 are disposed in assembled relation about shaft 12, this sleeve portions 32 and 33 thereof will define a substantially cylindrical sleeve while flange portions 40 and 41 will define a radially extending flange at one end thereof and extending completely around the shaft. As seen in FIG. 3, it will be noted that the internal juncture between the radial flange portions and the sleeve portions of each of the bearing members is partially broken away as indicated by reference numeral 43 to eliminate any contact between the axle 12 and the bearing member other than along the lining thereof.

Figure 2:
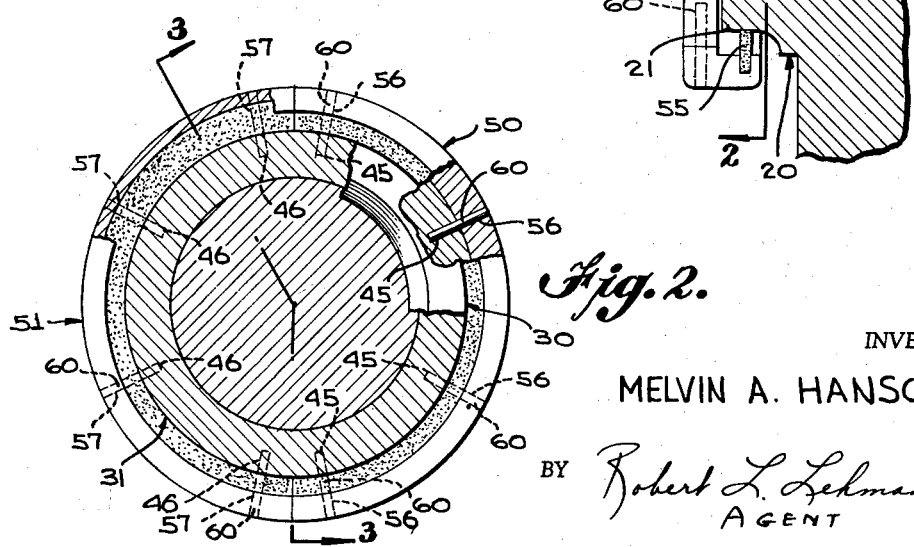
FIG. 2 is a sectional view taken substantially along line 2—2 of FIG. 3 looking in the direction of the arrows and being partly broken away for the sake of illustration.

Each of flanges 40 and 41 is provided with a plurality of substantially radially extending openings thereon and as seen particularly in FIG. 2, bearing member 30 is provided with four such openings 45, these openings being substantially spaced from one another while bearing member 31 is also provided with four spaced substantially radially extending openings 46.

The dust sealing means support means of the present invention comprises a pair of complementary members 50 and 51, these members being substantially annular and semi-circular in configuration, and as seen in FIG. 3, each of these annular members is provided with a counter bore or recessed portion as indicated by reference numeral 52. A peripherally extending annular groove 53 is formed in encircling relationship to the counter bore 52 and faces radially inwardly for supporting therewithin a dust sealing means 55 of conventional construction, the sealing means in each case being annular and substantially semi-circular whereby when the two support members are in assembled relation, the dust sealing means will seal completely around the periphery of the step 21. It will be apparent as seen in FIG. 3 that the dust sealing means rides on the outer surface of step 21 of flange 20 thereby preventing foreign matter from passing into the bearing area between the lining of the bearing members and the axle 12.

Each of support members 50 and 51 is provided with a plurality of substantially radially extending openings formed therethrough. Referring to FIG. 2, it will be seen that support member 50 is provided with four openings 56 formed therethrough at substantially equally spaced positions, these openings 56 being aligned with openings 45 formed in the flange portion 40 of bearing member 30. In a similar manner, support member 51 is provided with four equally spaced substantially radially extending openings 57 which are adapted to be aligned with the openings 46 formed in the flange 41 of the bearing member 31.

Attaching means is provided for rigidly attaching the support members 50 and 51 to the flange portions 40 and 41 respectively, these attaching means being in the form of dowels 60, these dowels having an interference pressed fit in the aligned openings formed in the flanges of the bearing members and in the support members.

It is evident that when the members are in the assembled position shown in FIGS. 2 and 3, there can not possibly by any loosening up or slipping of the support members with respect to the bearing members, and yet at the same time the dowels can be removed when desired so as to permit the separation and replacement of the components as desired. It should be noted that while the openings formed in the adjacent flanges and support members and the dowels received therein are four in number, it is only essential that at least two such pairs of aligned openings for receiving dowels be provided in each flange on the bearing member and the associated support member. The provision of at least two dowels for connecting together the bearing members and support members ensures that there will not be any pivoting movement of the support members with respect to the flanges of the adjacent bearing members.

As an additional safety feature of the present invention, the dowels 60 may be formed of a suitable anti-friction material such as Phosphor bronze such that should the end face of the bearing members wear away due to frictional contact with the adjacent wheel face to the point where the wheel faces engages one or more of the dowels, the wheel face will not be scored.

It is apparent from the foregoing that there is provided a traction motor support bearing incorporating a new and novel means for mounting a dust sealing means thereon. The dust sealing means support means and the bearing means are separable from one another, and may be individually replaced as desired thereby permitting one or the other of the portions to be re-used with new components.

The structure of the present invention is cheaper to manufacture than the integral unit disclosed in the aforementioned U.S. patent, and furthermore, separable means for supporting the dust sealing means will not loosen up during use as occurs with separable dust guard means employed in the prior art. The structure of the present invention is quite simple and inexpensive in construction and yet is sturdy and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A traction motor support bearing comprising a pair of complementary bearing members having substantially semi-cylindrical sleeve portions and flange portions at one end thereof, said bearing members cooperating to form a generally cylindrical bearing means having a central bore therethrough and a radially extending flange at one end thereof, separate dust sealing means support means comprising a pair of complementary support members cooperating to define a substantially annular support means, said annular support means having a peripheral groove formed on the inner face thereof and directed radially inwardly, said groove being adapted to carry dust sealing means, each of said support members having at least two substantially radially extending openings formed therein, each of said bearing members having at least two substantially radially extending openings formed therein adapted to be aligned with the radially extending openings in the adjacent support members, and attaching means extending through the aligned openings formed in said support members and bearing members for rigidly attaching said support members to said bearing members, said attaching means comprising a plurality of dowels, each of said dowels having an interference fit with an opening in one of said bearing members and the adjacent aligned opening in one of said support members, each of said dowels being formed of Phosphor bronze material to prevent scoring of a wheel face if the adjacent face of the flange on the associated bearing member should wear away.

2. A traction motor support bearing comprising a pair of complementary bearing members having substantially semi-cylindrical sleeve portions and flange portions at one end thereof, said bearing members cooperating to form a generally cylindrical bearing means having a central bore therethrough and a radially extending flange at one end thereof, separate dust sealing means support means comprising a pair of complementary support members cooperating to define a substantially annular support means, said annular support means having a peripheral groove formed on the inner face thereof and directed radially inwardly, said groove being adapted to carry dust sealing means, each of said support members having at least two substantially radially extending openings formed therein, each of said bearing members having at least two substantially radially extending openings formed therein adapted to be aligned with the radially extending openings in the adjacent support members, and attaching means extending through the aligned opening formed in said support members and bearing members for rigidly attaching said support members to said bearing members, said attaching means comprising a plurality of dowels, each of said dowels having an interference fit with an opening in one of said bearing members and the adjacent aligned opening in one of said support members, each of said dowels being formed of anti-friction material to prevent scoring of a wheel face if the adjacent face of the flange on the associated bearing member should wear away.

References Cited in the file of this patent

UNITED STATES PATENTS

| | | |
|---|---|---|
| 1,197,520 | Mallard | Sept. 5, 1916 |
| 2,439,692 | McKay | Apr. 13, 1948 |
| 2,954,263 | Kalny | Sept. 27, 1960 |

FOREIGN PATENTS

| | | |
|---|---|---|
| 187,358 | Austria | Oct. 25, 1956 |